United States Patent
Yoshitake et al.

(10) Patent No.: US 10,239,758 B2
(45) Date of Patent: *Mar. 26, 2019

(54) SILICA SOL AND METHOD FOR PRODUCING SILICA SOL

(71) Applicant: NISSAN CHEMICAL INDUSTRIES, LTD., Tokyo (JP)

(72) Inventors: Keiko Yoshitake, Sodegaura (JP); Naohiko Suemura, Sodegaura (JP); Megumi Shimada, Sodegaura (JP); Ichitaro Kikunaga, Sodegaura (JP)

(73) Assignee: NISSAN CHEMICAL INDUSTRIES, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/896,219

(22) PCT Filed: Jun. 5, 2014

(86) PCT No.: PCT/JP2014/065016
§ 371 (c)(1),
(2) Date: Dec. 4, 2015

(87) PCT Pub. No.: WO2014/199903
PCT Pub. Date: Dec. 18, 2014

(65) Prior Publication Data
US 2016/0130152 A1    May 12, 2016

(30) Foreign Application Priority Data
Jun. 10, 2013 (JP) ................................ 2013-122248

(51) Int. Cl.
*C01B 33/141* (2006.01)
*C01B 33/145* (2006.01)

(52) U.S. Cl.
CPC .......... *C01B 33/145* (2013.01); *C01B 33/141* (2013.01)

(58) Field of Classification Search
CPC ........................... C01B 33/141; C01B 33/145
See application file for complete search history.

(56) References Cited

U.S. PATENT DOCUMENTS

| | | | |
|---|---|---|---|
| 4,462,188 A * | 7/1984 | Payne | H01L 21/30625 106/3 |
| 6,025,455 A * | 2/2000 | Yoshitake | C01B 33/145 106/287.12 |
| 9,284,197 B2 * | 3/2016 | Suemura | B82Y 30/00 |
| 9,777,141 B2 * | 10/2017 | Yoshitake | C01B 33/141 |
| 2004/0002551 A1 * | 1/2004 | Park | C01B 33/141 516/81 |
| 2009/0143490 A1 * | 6/2009 | Masuda | C01B 33/148 516/34 |
| 2011/0281974 A1 * | 11/2011 | Suemura | B82Y 30/00 523/456 |
| 2016/0068664 A1 * | 3/2016 | Suemura | C08K 9/06 523/443 |
| 2016/0130152 A1 * | 5/2016 | Yoshitake | C01B 33/145 516/86 |
| 2016/0130425 A1 * | 5/2016 | Yoshitake | C01B 33/141 523/213 |
| 2017/0001870 A1 * | 1/2017 | Yoshitake | C01B 33/145 |

FOREIGN PATENT DOCUMENTS

| | | |
|---|---|---|
| CN | 102216387 A | 10/2011 |
| JP | H06-316407 A | 11/1994 |
| JP | 2003-517989 A | 6/2003 |
| JP | 2004-026649 A | 1/2004 |
| JP | 2005-060219 A | 3/2005 |
| JP | 2005-536426 A | 12/2005 |
| JP | 2007-153732 A | 6/2007 |
| JP | 2008137854 | 6/2008 |
| JP | 2009-263484 A | 11/2009 |
| WO | 01/046072 A1 | 6/2001 |
| WO | 2004/018359 A1 | 3/2004 |
| WO | 2008/015943 A1 | 2/2008 |

OTHER PUBLICATIONS

Stöber, Werner et al. "Controlled Growth of Monodisperse Silica Spheres in the Micron Size Range," Journal of Colloid and Interface Science, vol. 26, pp. 62-69, 1968.
Aug. 26, 2014 Search Report issued in International Patent Application No. PCT/JP2014/065016.
Sep. 4, 2017 Office Action issued in Chinese Patent Application No. 201480032863.5.

* cited by examiner

*Primary Examiner* — Michael A Salvitti
(74) *Attorney, Agent, or Firm* — Oliff PLC

(57) ABSTRACT

A silica sol which has excellent moisture absorption resistance and stability as well as high purity and which does not cause coloring of a solvent or a resin to which the silica sol has been applied. The silica sol contains high-purity silica particles, water and/or a liquid organic medium serving as a dispersion medium, and an organic base compound, the silica particles being dispersed in the dispersion medium, wherein the silica particles satisfy the following requirements (a) to (c): (a) the silica particles have a specific surface area, as determined through a nitrogen absorption method, of 20 to 500 $m^2/g$; (b) the silica particles have a moisture absorption amount per specific surface area thereof of 0.5 $mg/m^2$ or less; and (c) the organic base compound is not substantially contained in the inside thereof.

10 Claims, No Drawings

SILICA SOL AND METHOD FOR PRODUCING SILICA SOL

TECHNICAL FIELD

The present invention relates to a high-purity silica sol and to a method for producing the silica sol.

BACKGROUND ART

Hitherto, for years there has been known a method for producing silica sol through neutralization or ion-exchange of water glass serving as a raw material. Also, it has been known that silica micropowder can be produced through pyrolysis of silicon tetrachloride. An alternative known method for producing a high-purity silica sol is based on hydrolysis of a silicon alkoxide in an alcoholic aqueous solution in the presence of a basic catalyst. In one reported method, a 0.28 mol/L tetraethyl silicate is added to an alcoholic solution containing several mol/L-order ammonia and several mol/L to 15 mol/L water, and the mixture is hydrolyzed, to thereby obtain silica particles having a diameter of 50 to 900 nm (see, for example, Non-Patent Document 1).

Another known method for producing silica sol includes hydrolysis of a silicon alkoxide in the presence of ammonia serving as a hydrolysis catalyst. An alternative method is based on hydrolysis of a silicon alkoxide in the presence of an organic base compound serving as a hydrolysis catalyst. In one exemplary disclosed method, silica sol is produced through hydrolysis of tetraethyl silicate in the presence of a catalyst such as tetramethylammonium hydroxide (see, for example, Patent Document 1). Another method for producing neutral colloidal silica is disclosed, which method includes hydrolysis of tetramethyl silicate in the presence of a catalyst containing a quaternary ammonium salt, an aminoalcohol, a morpholine, or a piperazine (see, for example, Patent Document 2).

Another disclosed silica sol production method includes adding ammonia to a silica sol containing silica particles formed under specific conditions, whereby the sol is concentrated under control of pH (see, for example, Patent Document 3). A similar known method for producing a colloidal silica composition includes adding tetraethylammonium hydroxide to a colloidal silica composition containing silica particles formed under specific conditions, to thereby adjust the hydrogen ion concentration, and then concentrating the colloidal silica (see, for example, Patent Document 4).

PRIOR ART DOCUMENTS

Patent Documents

[Patent Document 1] Japanese Patent Publication Laid-Open (kokai) No. Hei 06-316407
[Patent Document 2] Japanese Patent Publication Laid-Open (kokai) No. 2007-153732
[Patent Document 3] Japanese Patent Publication Laid-Open (kokai) No. 2005-60219
[Patent Document 4] Japanese Patent Publication Laid-Open (kokai) No. 2004-26649

Non-Patent Documents

Non-Patent Document 1: Journal of Colloid and Interface Science, Vol. 26 (1968), p. 62 to 69

SUMMARY OF THE INVENTION

Problems to be Solved by the Invention

However, when the method for producing silica sol through neutralization or ion-exchange of water glass serving as a raw material is employed, impurities such as metals and free anions cannot be completely removed. In the silicon tetrachloride pyrolysis technique, silica forms aggregated particles, which impede formation of a monodispersion silica sol even through dispersing the particles in water or organic liquid. Furthermore, when chloride ions originating from silicon tetrachloride remain as an impurity, high-purity silica sol fails to be obtained. As a result, the formed silica sol cannot find specific uses where high purity is required; e.g., electronic material uses.

When the method disclosed in Non-Patent Document 1 is employed, a large number of unhydrolyzed alkoxyl groups remain inside the formed silica particles, and alcohol is released from the silica particles via heating or hydrolysis. Thus, difficulty is encountered in formation of high-density silica particles and in production of a silica sol having excellent moisture absorption resistance. When such a silica sol is added to a resin or the like, difficulty is encountered in producing a resin composite having moisture resistance, due to the high moisture absorptivity of the silica. In another case, after elimination of alkoxyl groups via hydrolysis, pores or silanol groups remain inside the silica particles, under certain conditions. In such a case, water, a basic catalyst, alcohol, etc. may remain through adsorption. Thus, when such a silica sol is used as a filler for resin, the characteristics of the resin may be impaired by the basic catalyst or the like.

With the method in which silicon alkoxide is hydrolyzed with ammonia, a large amount of ammonia may often remain in the formed silica sol. Thus, when the silica sol is employed in the form of a silica sol dispersed in organic solvent or as an additive for resin, ammonia reacts with the organic solvent or a resin component, to thereby problematically cause coloring of the sol or the resin. One conceivable approach is to completely remove ammonia. However, if this approach is employed, the silica sol becomes acidic, resulting in instability of the sol.

In the methods described in Patent Documents 1 and 2, the methods each employing an organic base compound as a hydrolysis catalyst, the formed sol or resin is undesirably colored by heating or a similar process in the case where the silica sol is employed in the form of a silica sol dispersed in organic solvent or as an additive for resin, when a large amount of the organic base compound is incorporated into the silica particles during the growth thereof. In addition, the basic substance which has been incorporated into the particles neutralizes negative charge of silica, whereby stability of the silica sol is problematically impaired in a neutral pH region.

The methods described in Patent Documents 3 and 4 encounter difficulty in production of high-density silica particles. Thus, silica particles having low moisture absorptivity fail to be produced, making it difficult to produce a silica sol having excellent moisture absorption resistance. Also, the particles formed through such a method tend to cause aggregation during the growth of the particles, when the particle size thereof is some tens of nanometers or less, thereby problematically failing to yield a silica sol in which spherical silica particles are highly dispersed.

In view of the foregoing, an object of the present invention is to provide a silica sol which has excellent moisture absorption resistance and stability as well as high purity and which does not cause coloring of a solvent or a resin to which the silica sol has been applied. Another object is to provide a method for producing the silica sol.

Means for Solving the Problems

In one mode of the present invention to solve the aforementioned problems, there is provided a silica sol, characterized in that the silica sol comprises high-purity silica particles, water and/or a liquid organic medium serving as a dispersion medium, and an organic base compound, the silica particles being dispersed in the dispersion medium, wherein the silica particles satisfy the following requirements (a) to (c):

(a) the silica particles have a specific surface area, as determined through a nitrogen absorption method, of 20 to 500 $m^2/g$;

(b) the silica particles have a moisture absorption amount per specific surface area thereof of 0.5 $mg/m^2$ or less; and (c) the organic base compound is not substantially contained in the inside thereof.

The silica particles are preferably produced through hydrolysis of a silicon alkoxide.

The silica particles preferably satisfy the following formula:

$$D2 \times S \leq 6800 \quad [F1]$$

(wherein S ($m^2/g$) represents a specific surface area determined through the nitrogen absorption method, and D2 (nm) represents a mean dispersed particle size in the dispersion medium as determined through a dynamic light scattering method).

Preferably, the organic base compound content is 0.001 to 0.5 mmol/g, with respect to the silica particles.

Preferably, the organic base compound has one nitrogen atom in one molecule thereof and is at least one compound selected from the group consisting of a secondary amine, a tertiary amine, and a quaternary ammonium hydroxide.

Preferably, the silicon alkoxide is at least one compound selected from the group consisting of tetramethyl silicate (TMOS), tetraethyl silicate (TEOS), methyl triethyl silicate, dimethyl diethyl silicate, trimethyl ethyl silicate, and a trialkyl silicate having a C1 or C2 alkyl group.

In another mode of the present invention to solve the aforementioned problems, there is provided a method for producing a silica sol, characterized in that the method comprises the following steps (A), (B), and (C):

(A) a step of providing a medium which is formed of water and/or a hydrophilic organic solvent, which contains water in an amount of 60 mass % or more and ammonia in an amount of 0.005 to 1.0 mol with respect to 1 L of the medium, and which is at 60° C. or higher;

(B) a step of continuously or intermittently adding, to the medium, a silicon alkoxide in such an amount that the ratio by mole of ammonia to the entirety of the silicon alkoxide added (N/Si) is adjusted to 0.01 to 1.0, to thereby form silica particles, while the following conditions (i) to (iii):

(i) the N/Si mole ratio is 0.01 or higher during the course of reaction;

(ii) the medium has a water content of 60 mass % or higher; and (iii) the medium has a temperature of 60° C. or higher, are maintained; and (C) a step of adding an organic base compound to the medium in which the silica particles obtained in step (B) are dispersed, and then removing the entirety or a part of the ammonia from the medium.

In step (C), after formation of the silica particles, the reaction medium is preferably heated at a temperature equal to or higher than the boiling temperature of the reaction medium, in order to remove the entirety or a part of the ammonia.

Effects of the Invention

The present invention enables provision of a silica sol which has excellent moisture absorption resistance and stability as well as high purity and which does not cause coloring of a solvent or a resin to which the silica sol has been applied.

The present invention also enables provision of a method for producing a silica sol which has excellent moisture absorption resistance and stability as well as high purity and which does not cause coloring of a solvent or a resin to which the silica sol has been applied.

MODES FOR CARRYING OUT THE INVENTION

The silica sol of an embodiment comprises high-purity silica particles, water and/or a liquid organic medium serving as a dispersion medium, and an organic base compound, the silica particles being dispersed in the dispersion medium, wherein the silica particles satisfy the following requirements (a) to (c):

(a) the silica particles have a specific surface area, as determined through a nitrogen absorption method, of 20 to 500 $m^2/g$;

(b) the silica particles have a moisture absorption amount per specific surface area thereof of 0.5 $mg/m^2$ or less; and (c) the organic base compound is not substantially contained in the inside thereof.

The silica sol of this embodiment will next be described in detail.

Firstly, regarding requirement (a), the silica particles have a specific surface area, as determined through a nitrogen absorption method, of 20 to 500 $m^2/g$, preferably 30 to 300 $m^2/g$. When the specific surface area is less than the lower limit of the range, effects of nano particles cannot be fully attained, whereby effects of improving properties such as surface hardness, heat resistance, and insulating property, of the resin into which silica is incorporated cannot fully be attained. In the case where a silica sol falling outside the range is used in a resin composite or a similar material, transparency of the products may be impaired. When the specific surface area is greater than the upper limit of the range, dispersibility of silica in a liquid organic medium or a resin decreases, making addition at high concentration difficult. In addition, since adsorption of water onto silica particles is promoted, an organic substance serving as a particle surface-modifying agent for preventing water adsorption must be used in a large amount.

Regarding requirement (b), the silica particles have a moisture absorption amount per specific surface area of 0.5 $mg/m^2$ or less, preferably 0.35 $mg/m^2$ or less. When the moisture absorption amount per specific surface area is greater than the upper limit of the range, a silica sol having excellent moisture absorption resistance cannot be produced. In the case where a silica sol falling outside the range is used in a resin composite or a similar material, the moisture resistance of the resin composite tends to decrease.

Regarding requirement (c), the silica particles do not substantially contain an organic base compound in the inside thereof. The requirement is equivalent to the silica particles not being produced via hydrolysis of a silicon alkoxide in the presence of an organic base compound serving as a hydrolysis catalyst or the like. In other words, the requirement is equivalent to the silica particles not being produced via hydrolysis of a silicon alkoxide in the presence of, for example, ammonia serving as a hydrolysis catalyst. When silica particles satisfying requirement (c) are used, a high-purity silica sol can be produced. Such a silica sol can find specific uses where high purity is required; e.g., electronic material uses.

As used herein, the "specific surface area, as determined through a nitrogen absorption method" in requirement (a) refers to a surface area of silica particles per unit weight thereof. Also, the "moisture absorption amount per specific surface area of the silica particles" in requirement (b) refers to the amount of water absorption per unit surface area of the silica particles. As described in the below-mentioned Examples, the specific surface area and the water absorption amount can be calculated through an experiment employing, for example, a dry powder of silica particles.

As used herein, the "the organic base compound is not substantially contained in the inside of the silica particles" in requirement (c) refers to an organic base compound content of 0.2 mmol/g or less, preferably 0.1 mmol/g or less. Even when a base is released to or adsorbed on the surfaces of silica particles (outside the silica particles), if such silica particles from which the outside base has been removed through ion exchange or a similar technique do not substantially contain an organic base compound inside thereof, requirement (c) is satisfied when the inside organic base compound content is equal to or less than the above upper limit.

Such silica particles that satisfy requirements (a) to (c) may be produced through, for example, the aforementioned technique in which a silicon alkoxide is hydrolyzed.

That is, through hydrolyzing a silicon alkoxide in the presence of ammonia serving as a hydrolysis catalyst and polymerizing the formed active silicic acid, silica particles having a specific surface area, as determined through a nitrogen absorption method, of 20 to 500 m$^2$/g can be produced (requirement (a)).

Also, through controlling conditions including ammonia concentration and reaction temperature to specific values in hydrolysis of a silicon alkoxide, polymerization of the active silicic acid is promoted, whereby high-density silica particles having a moisture absorption amount per specific surface area of 0.5 mg/m$^2$ or less can be produced (requirement (b)).

Furthermore, by use of ammonia as a hydrolysis catalyst in hydrolysis of a silicon alkoxide, silica particles can be grown without using an organic base compound as a hydrolysis catalyst. The thus-obtained silica particles have high density and no such pore size that an organic base compound can enter. Therefore, even though an organic base compound is added after growth of silica particles, the organic base compound cannot enter the particles, whereby silica particles not substantially having an organic base compound can be produced (requirement (c)).

Notably, even though ammonia is used as a hydrolysis catalyst, ammonia does not generally remain in the silica particles during growth of the particles. In addition, by virtue of a relatively small molecule, removal of ammonia from the inside of the silica particles is easy. Thus, by use of ammonia as a hydrolysis catalyst in hydrolysis of a silicon alkoxide, high-purity silica particles can be readily formed without using ammonia as a hydrolysis catalyst.

Therefore, in this embodiment, silica particles satisfying the aforementioned requirements (a) to (c) can be produced in the presence of, for example, ammonia serving as a hydrolysis catalyst under specifically controlled conditions, including the ammonia concentration of the reaction medium and reaction temperature.

Meanwhile, silica particles may also be produced through a conceivable method differing from the method of this embodiment. The alternative method may be a vapor phase technique or a firing technique including, for example, pyrolysis of silicon tetrachloride, to thereby yield a silica micropowder. However, in a vapor phase technique or a firing technique requiring a firing step, the formed silica micropowder aggregates to form secondary particles. Even though such secondary particles are dispersed in water or a liquid organic medium, a mono-dispersed silica sol cannot be produced.

Therefore, the silica particles contained in the silica sol of the silica sol of the present embodiment are assessed as having excellent dispersibility. As an index for dispersibility of silica particles in a medium, the silica particles preferably satisfy the following formula:

$$D2 \times S \leq 6800 \qquad [F2]$$

(wherein S (m$^2$/g) represents a specific surface area as determined through a nitrogen absorption method (the BET method), and D2 (nm) represents a mean dispersed particle size in a medium as determined through the dynamic light scattering method (DLS method).

In other words, in the case where the dry powder obtained by removing the medium is a pure, dense silica powder, the mean particle size D1 (nm) can be calculated by a specific surface area S (m$^2$/g), as determined through a nitrogen absorption method. Thus, the mean particle size D1 (nm) determined through the BET method and the mean dispersed particle size D2 determined through the DLS method have the following relationship (D2/D1).

$$D1 = 2720/S \qquad [F3]$$

$$D2/D1 \leq 2.5 \qquad [F4]$$

In the case where the above dry powder contains a component other than silica, such as an organic substance serving as a surface-treating agent, or the silica particles have low density, the mean particle size D1 cannot be directly calculated from the specific surface area S. However, similar to pure silica, the greater the specific surface area S, the smaller the mean particle size D1. Thus, a silica sol having a large value of the product of the mean dispersed particle size D2× the specific surface area S means a sol having a mean dispersed particle size of silica particles dispersed in a medium which is larger than the mean particle size of the silica particles obtained by drying out the medium. This feature corresponds to the case where the silica particles are bonded together to provide a non-spherical form or the case where the silica particles have a wide particle size distribution profile.

That is, when the silica particles contained in the silica sol of this embodiment satisfy the aforementioned relationship, a silica sol can be suitably produced by use of silica particles having high dispersibility.

In addition, the silica sol of the embodiment contains silica particles satisfying requirements (a) to (c), which particles are dispersed in water and/or a liquid organic medium, and an organic base compound. In production of silica particles through hydrolysis of a silicon alkoxide, a silica sol can be produced by incorporating an organic base compound into the formed silica particles, instead of by adding an organic base compound as a hydrolysis catalyst in formation of silica particles.

In this embodiment, the incorporated organic base compound can adjust the pH of the medium and prevent the medium from being acidic, whereby the formed silica sol can be stabilized. However, when the amount of the organic base compound is excessive, the formed silica sol containing the organic base compound in an excessive amount may adversely affect a liquid organic medium-dispersed sol or a resin additive produced therefrom. Therefore, the organic base compound content is preferably maintained at a minimum required amount for stabilizing the silica sol.

Thus, the organic base compound content is preferably 0.001 to 0.5 mmol/m$^2$ with respect to the silica particles, more preferably 0.005 to 0.1 mmol/m$^2$. When the organic base compound content is less than the lower limit of the range, stabilization of silica particles is impeded, whereas when the organic base compound content is greater than the upper limit of the range, the excess organic base compound may impair dispersibility of the silica particles in a solvent, a resin, etc., or may color a resin to which a liquid organic medium serving as a dispersion medium or a relevant sol has been added.

Preferably, the incorporated organic base compound has one nitrogen atom in one molecule thereof and is at least one compound selected from the group consisting of a secondary amine, a tertiary amine, and a quaternary ammonium hydroxide. More preferably, the organic base compound is at least one of a secondary amine and a tertiary amine. This is the reason why when such an amine compound is used in a liquid organic medium-dispersed sol or as a resin additive, the amine compound does not readily reacts with the liquid organic medium or a resin component, thereby preventing coloring of and impairment of characteristics of sol products and molded products.

However, the organic base compound may be a compound which can stabilize silica particles and which cannot be substantially incorporated into silica particles when added after growth of the silica particles. Thus, so long as the gist of the present invention is not changed, the organic base compound may be a primary amine or a compound having a plurality of nitrogen atoms in one molecule thereof.

Specifically, examples of the organic base compound which may be used in this embodiment include primary to tertiary amines such as an alkylamine, an alkenylamine, an aralkylamine, an alicyclic amine, an alkanolamine, and a cyclic amine; a quaternary ammonium hydroxide, and a basic amino acid.

Examples of the alkylamine include diethylamine, triethylamine, isopropylamine, diisopropylamine, triisopropylamine, n-propylamine, di-n-propylamine, tri-n-propylamine, isobutylamine, diisobutylamine, triisobutylamine, n-butylamine, di-n-butylamine, tri-n-butylamine, sec-butylamine, tert-butylamine, pentylamine, dipentylamine, tripentylamine, 2-ethylhexylamine, di-2-ethylhexylamine, n-octylamine, di-n-octylamine, tri-n-octylamine, N-ethyldiisopropylamine, cyclohexylamine, dicyclohexylamine, N,N-dimethylbutylamine, N,N-dimethylhexylamine, N,N-dimethyloctylamine, 3-ethoxypropylamine, 3-(dimethylamino)propylamine, and 3-(dibutylamino)propylamine. Examples of the alkenylamine include allylamine, diallylamine, and triallylamine.

Examples of the aralkylamine include benzylamine and N,N-dimethylbenzylamine. Examples of the alicyclic amine include piperidine, N-methylpiperidine, and quinuclidine. Examples of the alkanolamine include monoethanolamine, triethanolamine, N-methyldiethanolamine, N,N-dimethylethanolamine, N,N-diethylethanolamine, N,N-dibutylethanolamine, and triisopropanolamine. Examples of the cyclic amine include imidazole, imidazole derivatives, 1,8-diazabicyclo(5,4,0)undec-7-ene, 1,5-diazabicyclo(4,3,0)non-5-ene, and 1,4-diazabicyclo(2,2,2)octane. Examples of the quaternary ammonium hydroxide include tetramethylammonium hydroxide and tetraethylammonium hydroxide. Examples of the basic amino acid include lysine-arginine-histidine. These organic base compounds may be used singly or in combination of two or more species.

Notably, among the dispersion media including water and/or a liquid organic medium, water may be pure water or ultra-pure water such as ion-exchange water, ultrafiltrated water, reverse osmotic water, or distilled water. The water used herein may be appropriately chosen in accordance with uses and the like of the silica sol. For example, in production of a high-purity silica sol which can be used in electronic material, pure water or ultra-pure water having very low impurity content can be particularly suitably used. However, the water is not limited to the above examples, so long as so long as the gist of the present invention is not changed.

Among the dispersion media, the liquid organic medium refers to an organic substance which assumes liquid at ambient temperature. Examples of the organic substance which may be used in the invention include organic solvents such as alcohol, ether, ketone, ester, amide, and hydrocarbon; acrylic acid, methacrylic acid, and esters thereof; liquid epoxy materials such as glycidyl ethers of polyhydric alcohol or phenol; oxetane compounds; and liquid resin curing agents such as diol, phenol, and carboxylic anhydride.

Examples of the alcohol include methanol, ethanol, 1-propanol, 2-propanol, 1-butanol, isobutyl alcohol, 2-butanol, ethylene glycol, glycerin, propylene glycol, triethylene glycol, polyethylene glycol, benzyl alcohol, 1,5-pentanediol, and diacetone alcohol.

Examples of the ether include diethyl ether, dibutyl ether, tetrahydrofuran, dioxane, ethylene glycol monomethyl ether, ethylene glycol monopropyl ether, ethylene glycol monobutyl ether, propylene glycol monomethyl ether, propylene glycol monoethyl ether, diethylene glycol monomethyl ether, diethylene glycol monoethyl ether, and diethylene glycol monobutyl ether.

Examples of the ester include ethyl formate, methyl acetate, ethyl acetate, propyl acetate, butyl acetate, ethylene glycol monoethyl ether acetate, and ethylene glycol monobutyl ether acetate.

Specific examples of the ketone include acetone, methyl ethyl ketone, 2-pentanone, 3-pentanone, methyl isobutyl ketone, 2-heptanone, and cyclohexanone.

Examples of the hydrocarbon include n-hexane, cyclohexane, benzene, toluene, xylene, solvent naphtha, styrene, dichloromethane, and trichloroethylene.

No particular limitation is imposed on the acrylate ester or methacrylate ester. Specific examples include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-((meth)acryloxydiethoxy)phenyl]propane, 3-phenoxy-2-propanoyl acrylate, 1,6-bis(3- acryloxy-2-hydroxypropyl)-hexyl ether, trimethylolpropane tri(meth)acrylate, glycerol tri(meth)acrylate, tris-(2-hydroxyethyl) isocyanurate(meth)acrylate, pentaerythritol tri (meth)acrylate, pentaerythritol tetra(meth)acrylate, dipentaerythritol tri(meth)acrylate, dipentaerythritol penta(meth) acrylate, dipentaerythritol hexa(meth)acrylate, tripentaerythritol octa(meth)acrylate, tripentaerythritol hepta(meth)acrylate, 2-hydroxypropyl(meth)acrylate, 2-ethylhexyl(meth)acrylate, 2-norbornylmethyl methacrylate, 2-hydroxy-3-phenoxypropyl(meth)acrylate, 2-hydroxyethyl (meth)acrylate, 2,2-dimethylbutyl acrylate, 2-hydroxybutyl (meth)acrylate, n-propyl(meth)acrylate, n-butyl(meth)acrylate, i-butyl(meth)acrylate, t-butyl(meth)acrylate, n-hexyl (meth)acrylate, n-pentyl(meth)acrylate, n-octyl(meth) acrylate, 2-methoxyethyl(meth)acrylate, 2-methoxymethoxyethyl acrylate, 3-pentyl(meth)acrylate, 3-methyl-2-norbornyl methyl methacrylate, 3-methoxybutyl (meth)acrylate, 4-hydroxybutyl(meth)acrylate, 4-methyl-2-propylpentyl acrylate, 5-norbornen-2-yl methyl methacrylate, i-propyl(meth)acrylate, n-octadecyl(meth)acrylate, n-nonyl(meth)acrylate, sec-butyl(meth)acrylate, t-pentyl (meth)acrylate, ethyl α-hydroxymethylacrylate, butyl α-hydroxymethylacrylate, methyl α-hydroxymethylacrylate, (meth)acrylic acid, n-stearyl acrylate, isooctyl acrylate, isononyl acrylate, isobornyl(meth)acrylate, ethyl(meth) acrylate, ethyl carbitol acrylate, ethoxyethyl(meth)acrylate, ethoxyethoxyethyl(meth)acrylate, ethoxy diethylene glycol acrylate, cyclohexyl(meth)acrylate, cyclohexylmethyl (meth)acrylate, cyclopentyl acrylate, dicyclopentenyloxyethyl acrylate, cetyl acrylate, tetrahydrofurfuryl(meth)acrylate, phenoxyethyl(meth)acrylate, (meth)acryloyloxyethyl hydrogen phthalate, benzyl(meth)acrylate, methyl(meth) acrylate, methoxyethyl(meth)acrylate, methoxyethoxyethyl (meth)acrylate, methoxypolyethylene glycol(meth)acrylate, lauryl(meth)acrylate, 1,3-butanediol di(meth)acrylate, 1,4-butanediol di(meth)acrylate, 1,6-hexanediol di(meth)acrylate, 1,9-nonanediol di(meth)acrylate, allylated cyclohexyl di(meth)acrylate, glycerin di(meth)acrylate, dicyclopentanyl di(meth)acrylate, tricyclodecane dimethanol di(meth)acrylate, trimethylolpropane di(meth)acrylate, neopentyl glycol adipate di(meth)acrylate, neopentyl glycol di(meth)acrylate, neopentyl glycol hydroxypivalate diacrylate, ethoxylated trimethylolpropane tri(meth)acrylate, glycerin propoxy tri (meth)acrylate, trimethylolpropane polyethoxy tri(meth) acrylate, propionic acid-modified dipentaerythritol tri(meth) acrylate, ditrimethyolpropane tetra(meth)acrylate, propionic acid-modified dipentaerythritol tetra(meth)acrylate, propoxylated pentaerythritol tetra(meth)acrylate, propionic acid-modified dipentaerythritol penta(meth)acrylate, glycidyl methacrylate, hydroxyethyl(meth)acrylate, trimethylolpropane EO-modified triacrylate, and isobornyl acrylate.

As used herein, "ethylene glycol di(meth)acrylate" refers to either ethylene glycol diacrylate or ethylene glycol dimethacrylate.

Examples of the liquid epoxy compound include allyl glycidyl ether, 2-ethylhexyl glycidyl ether, phenyl glycidyl ether, p-tert-butylphenyl glycidyl ether, propylene glycol diglycidyl ether, polypropylene glycol diglycidyl ether, pentaerythritol polyglycidyl ether, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy) phenyl]propane, 1,2-cyclohexanedicarboxylic acid diglycidyl ester, 4,4'-methylenebis(N,N-diglycidylaniline), 3,4-epoxycyclohexylmethyl 3,4-epoxycyclohexanecarboxylate, trimethyloletane triglycidyl ether, triglycidyl-p-aminophenol, tetraglycidyl-m-xylenediamine, tetraglycidyl-diaminodiphenylmethane, tetraglycidyl-1,3-bisaminomethylcyclohexane, bisphenol A diglycidyl ether, bisphenol S diglycidyl ether, bisphenol F diglycidyl ether, pentaerythritol tetraglycidyl ether, resorcinol diglycidyl ether, diglycidyl phthalate, neopentyl glycol diglycidyl ether, polypropylene glycol diglycidyl ether, tetrabromobisphenol A diglycidyl ether, bisphenol hexafluoroacetone diglycidyl ether, pentaerythritol diglycidyl ether, hydrogenated bisphenol A diglycidyl ether, tris(2,3-epoxypropyl) isocyanurate, 1-{2,3-di(propionyloxy)}-3,5-bis(2,3-epoxypropyl)-1,3,5-triazine-2,4,6.(1H,3H,5H)-trione, 1,3-bis{2,3-di(propionyloxy)}-5-(2,3-epoxypropyl)-1,3,5-triazine-2,4, 6.(1H,3H,5H)-trione, monoallyl diglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethylene glycol diglycidyl ether, phenyl glycidyl ether, p-tert-butylphenyl glycidyl ether, adipic acid diglycidyl ether, o-phthalic acid diglycidyl ether, dibromophenyl glycidyl ether, 1,2,7,8-diepoxyoctane, 1,6-dimethylolperfluorohexane diglycidyl ether, 4,4'-bis(2,3-epoxypropoxyperfluoroisopropyl)diphenyl ether, 2,2-bis(4-glycidyloxyphenyl)propane, 3,4-epoxycyclohexylmethyl-3', 4'-epoxycyclohexane carboxylate, 3,4-epoxycyclohexyloxyrane, 2-(3,4-epoxycyclohexyl)-3',4'-epoxy-1,3-dioxane-5-spirocyclohexane, 1,2-ethylenedioxybis(3,4-epoxycyclohexylmethane), 4',5'-epoxy-2'-methylcyclohexylmethyl-4,5-epoxy-2-methylcyclohexane carboxylate, ethylene glycol bis(3,4-epoxycyclohexane carboxylate), bis(3,4-epoxycyclohexylmethyl) adipate, and bis (2,3-epoxycyclopentyl) ether.

As the resin monomer having an oxetane ring, a compound having one or 2 to 6 oxetane rings may be used. Examples thereof include 3-ethyl-3-hydroxymethyloxetane, 3-ethyl-3-(phenoxymethyl)oxetane, 3,3-diethyloxetane, and 3-ethyl-3-(2-ethylhexyloxymethyl)oxetane; and 1,4-bis(((3-ethyl-3-oxetanyl)methoxy)methyl)benzene, di((3-ethyl-3-oxetanyl)methyl) ether, and pentaerythritol tetrakis((3-ethyl-3-oxetanyl)methyl) ether.

Examples of the carboxylic anhydride include phthalic anhydride, methylhexahydrophthalic anhydride, hexahydrophthalic anhydride, hydrogenated methylnadic anhydride, trimellitic anhydride, hydrogenated trimellitic anhydride and its ester derivative: cyclohexane-1,2,4-tricarboxylic acid-1,2-anhydride-4-ethyl ester and cyclohexane-1,2,4-tricarboxylic acid-1,2-anhydride-4-(1-propyl) ester; pyromellitic anhydride, benzophenonetetracarboxylic anhydride, ethylene glycol bistrimellitate, glycerol tristrimellitate, maleic anhydride, tetrahydrophthalic anhydride, methyltetrahydrophthalic anhydride, endo-methylenetetrahydrophthalic anhydride, methyl-endo-methylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic anhydride, and chlorendic anhydride.

However, the liquid organic medium is not limited to the aforementioned examples, so long as the gist of the present invention is not changed. These liquid organic media and water may be used singly or in combination of two or more species. Needless to say, water and a liquid organic medium may be used as a mixture.

The method for producing the silica sol of an embodiment will next be described in detail. The method for producing the silica sol of this embodiment includes the following steps (A), (B), and (C):

(A) a step of providing a medium which is formed of water and/or a hydrophilic organic solvent, which contains water in an amount of 60 mass % or more and ammonia in an amount of 0.005 to 1.0 mol with respect to 1 L of the medium, and which is at 60° C. or higher;

(B) a step of continuously or intermittently adding, to the medium, a silicon alkoxide in such an amount that the ratio by mole of ammonia to the entirety of the silicon alkoxide added (N/Si) is adjusted to 0.01 to 1.0, to thereby form silica particles, while the following conditions (i) to (iii):

(i) the N/Si mole ratio is 0.01 or higher during the course of reaction;

(ii) the medium has a water content of 60 mass % or higher; and (iii) the medium has a temperature of 60° C. or higher, are maintained; and (C) a step of adding a silica sol organic base compound to the medium in which the silica particles obtained in step (B) are dispersed and then removing the entirety or a part of the ammonia from the medium.

The hydrolysis catalyst used for producing silica particles is ammonia. By use of ammonia, silica particles can be grown in the absence of an organic base compound serving as a hydrolysis catalyst. As a result, silica particles substantially containing no organic base compound can be yielded. Ammonia can be readily removed in a subsequent step through distillation or another technique.

In step (A), there is provided a medium which is formed of water and/or a hydrophilic organic solvent, which contains water in an amount of 60 mass % or more and ammonia in an amount of 0.005 to 1.0 mol with respect to 1 L of the medium, and which is at 60° C. or higher. By use of such a medium, an added silicon alkoxide can be suitably hydrolyzed, to thereby facilitate decreasing unreacted alkoxy groups present inside the silica particles. Examples water used in step (A) include pure water and ultra-pure water such as ion-exchange water, ultrafiltrated water, reverse osmotic water, and distilled water. These water species may be used singly or in combination of two or more members. As used herein, the water concentration is a water concentration (mass %) of a reaction medium excluding an ammonia component.

Other than water, no particular limitation is imposed on the reaction medium, so long as the gist of the present invention is not changed, and the aforementioned hydrophilic organic solvent may be used. Examples of the hydrophilic organic solvent include methanol, ethanol, propanol, isopropanol, butanol, isobutanol, ethylene glycol, acetonitrile, dimethyl sulfoxide, dimethylformamide, dimethylacetamide, acetone, tetrahydrofuran, and diethylene glycol. These hydrophilic organic solvents may be used singly or in combination of two or more species.

Notably, when the same solvent as an alcohol generated by hydrolysis of an silicon alkoxide is employed as a hydrophilic organic solvent, recovery and re-use of the alcohol in the reaction medium are facilitated. When tetramethyl silicate is used as the silicon alkoxide, methanol may be used as the hydrophilic organic solvent, whereas when tetraethyl silicate is used as the silicon alkoxide, ethanol may be used as the hydrophilic organic solvent.

In step (A), the medium is prepared such that the medium contains ammonia in an amount of 0.005 to 1.0 mol with respect to 1 L of the medium. In this case, the mole ratio (N/Si) can be suitably maintained at a specific level or higher in the subsequent step (B). When the initial ammonia concentration is lower than the lower limit of the range, the polymerization rate of the active silicic acid formed via hydrolysis of a silicon alkoxide in step (B) decreases, thereby making it difficult to produce of a silica sol having excellent moisture absorption resistance. When the initial ammonia concentration is higher than the upper limit of the range, difficulty is encountered in controlling the hydrolysis reaction rate in the subsequent step (B), whereby uniform particles may fail to be formed, and a silica sol having excellent moisture absorption resistance is difficult to produce.

In step (B), a silicon alkoxide is continuously or intermittently added to the reaction medium, whereby the water content and the mole ratio (N/Si) of the reaction medium can be appropriately adjusted. More specifically, the silicon alkoxide is preferably added to the reaction medium at 2 mol/h or less with respect to 1 L of the reaction medium, more preferably at 1 mol/h or less. In this case, the hydrolysis rate of the silicon alkoxide can adjusted to be lower than the silica aggregation rate, whereby continued presence alkoxy groups inside the silica particles can be prevented. As a result, high-density silica particles can be readily produced.

Regarding requirement (i) of step (B), the ratio by mole of ammonia to the entirety of the silicon alkoxide added (N/Si) is adjusted to 0.01 or higher during the course of reaction, preferably to 0.02 or higher. Through this control, a sufficient amount of ammonia with respect to the silicon alkoxide can be caused to be present in the reaction medium, whereby active silicic acid generated via hydrolysis can be rapidly bonded to the particles present in the reaction system. Thus, high-density silica particles can be obtained, from which a silica sol having excellent moisture absorption resistance can be produced.

Since alcohol is generated through hydrolysis of silicon alkoxide, an alcohol, the water content of the reaction medium gradually decreases with the progress of hydrolysis. Thus, regarding requirement (ii) of step (B), the water content of the reaction medium is maintained at 60 mass % or higher during feeding of silicon alkoxide, preferably at 80 mass % or higher. This control facilitates prevention of continued presence of unreacted alkoxy groups inside the silica particles.

In order to maintain the water content of the reaction medium at a level higher than the upper limit of the above range, the amount of silicon alkoxide added to the reaction medium is preferably controlled in such a manner that the generated alcohol concentration of the reaction medium does not rise excessively. In another preferred mode, a part of the generated alcohol is discharged to the outside of the reaction system through distillation or another technique, before rise in alcohol concentration.

Preferably, the silicon alkoxide is an alkyl ester of silicic acid monomer or a silicic acid oligomer having a polymerization degree of 2 to 3 and having a C1 or C2 alkyl group. Examples of preferred silicon alkoxides include tetramethyl silicate (TMOS), tetraethyl silicate (TEOS), methyl triethyl silicate, dimethyl diethyl silicate, trimethyl ethyl silicate, and a trialkyl silicate having a C1 or C2 alkyl group. Notably, a mixed ester having different alkyl groups in the molecule thereof, or a mixture of such mixed esters may also be used. Thus, when tetraethyl silicate is used as the silicon alkoxide, a mixed ester having different alkyl groups in the molecule thereof may be additionally present. These silicon alkoxides may be added as a non-diluted form or a dilute with a water-soluble organic solvent. The "water-soluble organic solvent" refers to a solvent which can dissolve both the silicon alkoxide and the reaction medium in a range of amount of addition of the solvent. Examples of preferred such solvents include alcohol, ketone, and ether.

Regarding requirement (iii) of step (B), the temperature of the reaction medium is elevated to 60° C. or higher. Through this control, polymerization of the active silicic acid generated through hydrolysis of the silicon alkoxide is promoted, whereby high-density silica particles can be obtained. Thus, a silica sol having excellent moisture absorption resistance can be produced.

On the other hand, the temperature of the reaction medium is preferably maintained at a temperature lower than the boiling temperature of the medium, in the course of hydrolysis of the silicon alkoxide. Through this control, evaporation of ammonia is suppressed, whereby a considerable drop in ammonia concentration in the silica sol production can be prevented. Under normal pressure, the boiling temperature of the reaction medium is lower than 100° C. However, since the alcohol generated from the alkoxide lowers the boiling temperature, the reaction temperature is preferably tuned in consideration of the alcohol concentration of the reaction medium. In the case where the above reaction is performed in a sealed pressure container, the reaction medium may be heated to 100° C. or higher.

When a silicon alkoxide is added to the reaction medium, the silicon alkoxide is hydrolyzed by the action of ammonia, and eventually, cores of silica are formed in the reaction medium. In this embodiment, when the initial ammonia concentration is controlled to fall within, for example, the aforementioned range, and the mole ratio (N/Si) is adjusted to 0.01 to 1.0 at the completion of addition of the silicate, a sufficient amount of ammonia with respect to the added silicon alkoxide can be constantly present in the reaction medium. Thus, the added silicon alkoxide polymerizes around the cores formed in the reaction medium, causing growth of silica nuclei.

During reaction, in order to maintain the mole ratio (N/Si) at 0.01 or higher, addition of silicon alkoxide may be appropriately stopped, and ammonia is added to the reaction medium, to thereby elevate the ammonia concentration.

In addition of silicon alkoxide to the reaction medium, the active silicic acid formed during hydrolysis of silicon alkoxide polymerizes, to thereby uniformly deposit on the silica particles under stirring. Through stirring the reaction medium, contact between undissolved silicon alkoxide and the reaction medium is promoted, whereby dissolution of undissolved matter in the reaction medium is promoted, to thereby facilitate dissolution and hydrolysis.

The aforementioned silicon alkoxide may be added to the reaction system from the site above the reactor to the liquid surface. Alternatively, the feed outlet may be brought into contact with the reaction medium, to thereby feed the alkoxide into the liquid. Through this procedure, gel formation and generation of coarse particles via hydrolysis, which would otherwise occur in the vicinity of the feed outlet, can be suppressed. Particularly, tetramethyl silicate, exhibiting high hydrolysis rate, is preferably added directly to the liquid.

Notably, before adding silicon alkoxide, silica particles serving as growth nuclei may also be added in advance to the reaction medium. Through the addition, a silica sol having a large mean particle size can be readily produced, as compared with the case where nuclei are caused to spontaneously generate and grow in the reaction medium. No particular limitation is imposed on the technique of adding silica particles serving as the nuclei, and there may be employed a procedure in which the reaction medium is maintained at 60° C. or lower, and a part of the silicon alkoxide is added, to thereby generate micronuclei through hydrolysis.

As described above, in this embodiment, through realizing the aforementioned initial ammonia concentration and water concentration satisfying the aforementioned conditions, and adding silicon alkoxide to the reaction medium such that mole ratio (N/Si) of the reaction medium thereof is adjusted to 0.01 to 1.0, and subjecting silicon alkoxide to hydrolysis at 60° C. or higher and a temperature lower than the boiling point of ammonia, a sufficient amount of ammonia with respect to the silicon alkoxide can be caused to be present in the reaction medium. Thus, the polymerization rate of the active silicic acid generated through hydrolysis of silicon alkoxide can be enhanced, to thereby promote the nucleic growth.

As a result, even though tetramethyl silicate, which has relatively high reactivity and whose reaction is difficult to control, is used as the silicon alkoxide, there can be produced silica particles which have a specific surface area, as determined through a nitrogen absorption method, of 20 to 500 $m^2/g$ and a moisture absorption amount per specific surface area of 0.5 $mg/m^2$ or less and which do not substantially contain an organic base compound in the inside thereof.

In the above embodiment, the thus-obtained silica particles are dispersed in the medium, and an organic base compound is further added to the medium, to thereby produce a silica sol. As mentioned above, in this embodiment, after production of silica particles, the organic base compound in such an amount as to stabilize the silica sol is added to the medium silica sol. Thus, silica particles which substantially contain no organic base compound inside the particles can be yielded. As a result, a high-purity silica sol can be produced.

On the other hand, a medium in which silica sol is dispersed contains ammonia serving as a hydrolysis catalyst. Accordingly, the active silicic acid is dissolved therein. Thus, in this embodiment, the entirety or a part of ammonia is removed from the medium. Through this procedure, the pH of the reaction system decreases, whereby active silicic acid remaining in the reaction medium becomes to deposit on the surfaces of the silica particles. Thus, the amount of active silicic acid can be reduced, and adverse effects on stability and moisture absorption resistance of the silica sol after concentration can be avoided.

No particular limitation is imposed on the method of removing ammonia, and distillation, ion exchange, ultrafiltration, etc. may be employed. Among them, a technique in which the medium is heated to evaporate ammonia at a temperature equal to or higher than the boiling temperature of the medium is preferred. Through the technique, the entirety or a part of ammonia can be reliably removed. Particularly, through heating while gradually decreasing the amount of ammonia, active silicic acid remaining in the reaction medium tends to deposit on the surfaces of the silica particles, whereby the surfaces of the silica particles can be densified.

After production of silica particles, in a preferred medium, the pH of the medium is lowered to 10 or less, and the medium is heated to 80° C. or higher, preferably 90° C. or higher. Through this procedure, the surfaces of the silica particles can be further densified, and a silica sol having excellent moisture absorption resistance can be yielded. No particular limitation is imposed on the method of lowering the pH of the medium to 10 or lower, and any of distillation, ion exchange, ultrafiltration, etc. may be employed.

Notably, in the case where the aqueous medium of the aqueous sol is substituted by an organic solvent, to thereby form an organic solvent-dispersed sol, both water and ammonia may be removed through distillation.

Thus, the step of removing ammonia may be carried out before or after adding the aforementioned organic base compound. That is, one possible procedure includes addition of an organic base compound at the timing of completion of removing a part of ammonia serving as a hydrolysis catalyst after completion of hydrolysis of the silicon alkoxide, and removing ammonia again. Alternatively, an organic base compound may be added after completion of hydrolysis of the silicon alkoxide, and ammonia serving as a hydrolysis catalyst may be completely removed.

In the step of removing ammonia after addition of the organic base compound, in the case where the organic base compound concentration of the medium may possibly decrease due to removal of the ammonia and the organic base compound, the organic base compound may be added in an increased amount so as to compensate the loss thereof.

EXAMPLES

The present invention will next be described in detail by way of examples, which should not be construed as limiting the invention thereto.

Water-Dispersed Silica Sol

Example 1

Silica sol [1A] of Example 1 was produced through the following procedure. Specifically, to a 3-L stainless steel reactor equipped with a stirrer and a condenser, pure water (2,237 g) and 28-mass % aqueous ammonia (2.5 g) were added, and the contents of the reactor were maintained at 80° C. by means of an oil bath. Subsequently, a commercial product of tetraethyl silicate (TEOS) (261 g) was added dropwise to the reactor over 2 hours continuously under stirring. After completion of feeding, the contents were continuously stirred for 1 hour while the reactor inside temperature was maintained at 80° C., and then heated to 90° C. Stirring was continued at 90° C. for 1 hour, to thereby provide a dispersion of grown silica particles.

Then, diisopropylamine was added to the dispersion of grown silica particles such that the amount thereof was adjusted to 0.04 mass % based on the dispersion. The dispersion in the reactor was evaporated, and the vapor was discharged to the outside of the reactor, to thereby concentrate the contents to a dispersion temperature of 99° C. Subsequently, the entirety of the dispersion in the reactor was removed from the reactor, and the recovered dispersion was concentrated by means of a rotary evaporator to 250 g under a reduced pressure of 13.3 kPa, to thereby yield silica sol [1A] having an $SiO_2$ content of 30.0 mass %, a pH of 7.3, a viscosity, as determined by means of a B-type viscometer at 25° C. (hereinafter referred to as "B-type viscosity"), of 8.5 mPa·s, and a mean dispersed particle size, as determined through dynamic light scattering (hereinafter referred to as "dynamic light scattering particle size) of 20 nm.

Example 2

To the same reactor as employed in Example 1, pure water (2,244 g) and 28-mass % aqueous ammonia (3.4 g) were added, and the contents of the reactor were maintained at 80° C. by means of an oil bath. Subsequently, a commercial product of tetramethyl silicate (TMOS) (253 g) was continuously fed to the reactor over 3 hours under stirring. After completion of feeding, the contents of the reactor were stirred for 1 hour while the reactor temperature was maintained at 80° C. Thereafter, the liquid temperature was elevated to 90° C., and stirring was continued for 1 hour, to thereby provide a dispersion of grown silica particles.

Subsequently, tri-n-propylamine was added to the above dispersion in such an amount that the amine content was adjusted to 0.04 mass %. The dispersion in the reactor was evaporated to the outside, to thereby concentrate the contents to a dispersion temperature of 99° C. Then, the entirety of the contents was recovered from the reactor and further concentrated by means of a rotary evaporator under a reduced pressure of 26.7 to 10.7 kPa, to thereby yield silica sol [2A] having an $SiO_2$ content of 30.0 mass %, a pH of 7.2, a B-type viscosity of 7.0 mPa·s, and a dynamic light scattering particle size of 26 nm.

Comparative Example 1

The procedure of Example 1 was repeated by means of the same reactor as employed in Example 1, except that no diisopropylamine was added after size regulation of silica particles, to thereby yield silica sol [1B] of Comparative Example 1. The thus-obtained sol was found to have an $SiO_2$ content of 30.0 mass %, a pH of 6.2, a B-type viscosity of 6.7 mPa·s, and a dynamic light scattering particle size of 20 nm.

Comparative Example 2

To the same reactor as employed in Example 1, pure water (2,235 g) and diisopropylamine (4.2 g) were added, and the contents of the reactor were maintained at 80° C. by means of an oil bath. Subsequently, a commercial product of tetraethyl silicate (TEOS) (261 g) was continuously fed to the contents of the reactor over 2 hours under stirring. After completion of feeding, the liquid temperature of the reactor was maintained at 80° C. for 1 hour and then elevated to 90° C., followed by continuously stirring for 1 hour, to thereby provide a dispersion of grown silica particles.

Subsequently, the dispersion in the reactor was evaporated to the outside, to thereby concentrate the contents to a dispersion temperature of 99° C. Then, the entirety of the contents was recovered from the reactor and further concentrated by means of a rotary evaporator under a reduced pressure of 13.3 kPa, to thereby yield silica sol [2B] having an $SiO_2$ content of 30.0 mass %, a pH of 7.3, a B-type viscosity of 20.0 mPa·s, and a dynamic light scattering particle size of 27 nm.

Comparative Example 3

To the same reactor as employed in Example 1, pure water (2,234 g) and tri-n-propylamine (6.0 g) were added, and the contents of the reactor were maintained at 80° C. by means of an oil bath. Subsequently, a commercial product of tetraethyl silicate (261 g) was continuously fed to the reactor over 2 hours under stirring. After completion of feeding, the reactor temperature was maintained at 80° C. for 1 hour, and then the liquid temperature was elevated to 90° C., followed by continuously stirring for 1 hour, to thereby provide a dispersion of grown silica particles.

Subsequently, the liquid in the reactor was evaporated to the outside, to thereby concentrate the contents to a liquid temperature of 95° C. Then, the entirety of the contents was recovered from the reactor and further concentrated to 375 g by means of a rotary evaporator under a reduced pressure of 13.3 kPa, to thereby yield silica sol [3B] having an $SiO_2$ content of 20.0 mass %, a pH of 7.2, a B-type viscosity of 15.0 mPa·s, and a dynamic light scattering particle size of 17 nm.

Thereafter, the sample was diluted with 0.01-mass % aqueous ammonia, and the dilute was subjected to particle size measurement through dynamic light scattering. The viscosity of the sample was determined at 25° C. by means of a B-type viscometer. Table 2 shows the results.

TABLE 1

|  |  | Ex. 1 | Ex. 2 | Comp. Ex. 1 | Comp. Ex. 2 | Comp. Ex. 3 |
|---|---|---|---|---|---|---|
| After growth of particle | Hydrolysis catalyst | ammonia | ammonia | ammonia | di-iPr amine | tri-n-Pr amine |
|  | Amount (mass %) | 0.028 | 0.038 | 0.028 | 0.168 | 0.24 |
|  | Titrated base (mass %) | 0.022 | 0.031 | 0.022 | 0.048 | 0.053 |
|  | Titrated/added (%) | 80 | 82 | 80 | 29 | 22 |
|  | N in particle (mass %) | 0.02 | 0.01 | 0.02 | 0.37 | 0.45 |
| Final sol | Silica sol | [1A] | [2A] | [1B] | [2B] | [3B] |
|  | Free base ammonia (mass %) | <0.002 | <0.002 | 0.005 | — | — |
|  | Free base amine (mass %) | 0.098 | 0.120 | — | 0.094 | 0.123 |
|  | N in particle (mass %) | 0.02 | 0.02 | 0.02 | 0.37 | 0.46 |

The amount of free base in each dispersion of grown silica particles for producing a silica sol of any of Examples 1 and 2 and Comparative Examples 1 to 3 was determined through titration. Also, the amount of free base in each of the silica sols (hereinafter may be referred to as "final sols") of Examples 1 and 2 and Comparative Examples 1 to 3 was determined through ion chromatography. The nitrogen content of each dispersion of grown silica particles and that of the silica particles of each final sol were determined by means of an element analyzer through the following procedures. Table 1 shows the results.

[Determination of Free Base]
Free Base in Dispersion of Grown Silica Particles (Titration Method)

The sample dispersion was pH-titrated with 0.1N hydrochloric acid, whereby the residual base content was calculated from the neutralization equivalent point. In addition, the ratio of amount of base determined through titration to amount of supplied catalyst was calculated.

Free Base in Final Sol (Ion Chromatography)

Each of the silica sols of Examples 1 and 2 and Comparative Examples 1 to 3 was diluted with 10-mmol/L hydrochloric acid. The dilute was placed in a settling tube equipped with ultrafiltration membrane and subjected to filtration by means of a centrifuge. The thus-obtained filtrate was analyzed through cation chromatography.

[Determination of Nitrogen Inside the Silica Particles]

A sample was subjected to the following preliminary treatment and then subjected to element analysis. Specifically, each of the silica sols of Examples 1 and 2 and Comparative Examples 1 to 3 was brought into contact with H-type cation exchange resin in an amount equal to or higher than the amount by equivalent of base. Free base was removed through filtration, and the product was dried in vacuum. The dry powder was analyzed by means of an element analyzer, to thereby determine the nitrogen content (mass %) of the dry powder.

[Determination of Particle Size and Viscosity Through Dynamic Light Scattering (DLS) Technique]

For assessing stability, each of the silica sols of Examples 1 and 2 and Comparative Examples 1 to 3 was placed in a sealable container and maintained at 50° C. for 2 weeks.

TABLE 2

|  |  | Ex. 1 | Ex. 2 | Comp. Ex. 1 | Comp. Ex. 2 | Comp. Ex. 3 |
|---|---|---|---|---|---|---|
| Final sol | Silica sol | [1A] | [2A] | [1B] | [2B] | [3B] |
| Initial properties | Viscosity (mPa · s) | 8.5 | 7.0 | 6.7 | 20.0 | 15.0 |
|  | DLS particle size D2 (nm) | 20.2 | 26.4 | 20.1 | 27 | 16.5 |
| 50° C., 2 weeks | Viscosity (mPa · s) | 8.7 | 7.0 | 560 | Gel | Gel |
|  | DLS particle size D2 (nm) | 19.9 | 26.3 | 42.2 | — | — |

As shown in Table 1, in Comparative Examples 2 and 3, in which an amine was used as a catalyst in particle size regulation, the amine was incorporated into the particles in the sol during growth of the particles. In the final sols, the amine remained in a considerable amount inside the particles. In contrast, in Examples 1 and 2 and Comparative Example 1, in which ammonia was used as a catalyst, the amount of base incorporated into the particles was small. Even when an amine was added thereto after formation of the silica particles, the amine was not incorporated into the particles.

However, as shown in Table 2, in Comparative Example 1, aggregation of particles occurred, leading to a considerable rise in viscosity at 50° C. after 2 weeks and an increase in DLS particle size, indicating poor storage stability. In Comparative Examples 2 and 3, in which an amine was added in particle size regulation, the entirety of the sol was solidified to form a gel, indicating poorer storage stability. In contrast, in Examples 1 and 2, no change in physical properties was observed even after storage at 50° C.

Comparative Example 4

According to the method of Example 1 disclosed in a prior art document (Japanese Patent Application Laid-Open (kokai) No. 2005-60219), silica particles were produced. Specifically, in the reactor as employed in Example 1 of the present invention, methanol (1,647 g), 28-mass % aqueous ammonia (42 g), and pure water (262.6 g) were mixed together, to thereby prepare feed liquid I (2,340 mL). A commercial product of tetramethyl silicate (195 mL, 200.9 g) and methanol (65 mL, 51.4 g) were mixed in another container, to thereby form feed liquid II. While feed liquid I was maintained at 20° C. in a cooling water bath, feed liquid II was continuously added to feed liquid I over 30 minutes. After completion of addition, the resultant mixture was further stirred for 1 hour, and then heated in an oil bath, to thereby evaporate the liquid in the container to the outside thereof for concentration.

To the concentrated product, pure water (530 g) was added dropwise, to thereby substitute methanol by water so as to attain a boiling temperature of 99° C., whereby a silica sol having an $SiO_2$ content of 15.0 mass % and a pH of 7.2 was obtained. To this sol (500 g), 28-mass % aqueous ammonia (0.5 g) was added, and the mixture was concentrated under a reduced pressure of 13.3 kPa, to thereby yield silica sol [4B] having an $SiO_2$ content of 30.0 mass %, a pH of 7.8, a B-type viscosity of 23.3 mPa·s, and a dynamic light scattering particle size of 36 nm.

Comparative Example 5

According to the method of Example 6 disclosed in a prior art document (Japanese Patent Application Laid-Open (kokai) No. 2005-60219), silica particles were produced. Specifically, in the reactor as employed in Example 1 of the present invention, methanol (1,647 g), 28-mass % aqueous ammonia (70 g), and pure water (235 g) were mixed together, to thereby prepare feed liquid I (2,340 mL). A commercial product of tetramethyl silicate (195 mL, 200.9 g) and methanol (65 mL, 51.4 g) were mixed in another container, to thereby form feed liquid II. While feed liquid I was maintained at 20° C. in a cooling water bath, feed liquid II was continuously added to feed liquid I over 30 minutes. After completion of addition, the resultant mixture was further stirred for 1 hour, and then heated in an oil bath, to thereby evaporate the liquid in the container to the outside thereof for concentration.

To the concentrated product, pure water (530 g) was added dropwise, to thereby substitute methanol by water so as to attain a boiling temperature of 99° C., whereby a silica sol having an $SiO_2$ content of 15.0 mass % and a pH of 7.5 was obtained. To this sol (500 g), 28-mass % aqueous ammonia (0.5 g) was added, and the mixture was concentrated under a reduced pressure of 13.3 kPa, to thereby yield silica sol [5B] having an $SiO_2$ content of 30.0 mass %, a pH of 7.9, a B-type viscosity of 25 mPa·s, and a dynamic light scattering particle size of 76 nm.

Each of the silica sols of Examples 1 and 2 and Comparative Examples 1 to 5 was dried to form a powder, and the specific surface area and percent moisture absorption thereof were calculated through the following procedure. Table 3 shows the results.

[Measurement of Specific Surface Area]

The specific surface area of each of the silica sols of Examples 1 and 2 and Comparative Examples 1 to 5 (aqueous silica sol) was determined through a nitrogen absorption method in the following manner. Specifically, an H-type cation exchange resin was added to the silica sol, to thereby remove free base and base adsorbed on the surfaces of the particles. Thereafter, the product was dried at 80° C. in a vacuum drier, to thereby form a silica gel. The silica gel was pulverized with a mortar and further dried at 180° C. for 3 hours, to thereby yield dry silica powder. The specific surface area S ($m^2/g$) of the powder was determined through a nitrogen absorption method. From the specific surface area S, the mean particle size D1 of each of the silica sols of Examples 1 and 2 and Comparative Examples 1 to 5 was calculated by the following formula.

$$D1\ (nm) = 2,720/S \tag{F5}$$

[Measurement of Percent Moisture Absorption and Moisture Absorption Amount Per Specific Surface Area]

The percent moisture absorption of each of the silica sols of Examples 1 and 2 and Comparative Examples 1 to 5 was determined in the following manner. Specifically, the same 180° C.-dried powder (0.2 g) as employed in specific surface area determination was placed in a weighing bottle, and the weight of the sample was determined. While the cap of the bottle was opened, the bottle was allowed to stand in an atmosphere (23° C., 50% RH) for 48 hours. Then, the bottle was closed by the cap, and the weight of the bottle was measured again. Percent moisture absorption was determined by the following formula.

The moisture absorption amount per specific surface area was determined based on the BET specific surface area by the following formula.

$$\text{Percent moisture absorption (\%)} = (\text{weight increase}/\text{sample amount}) \times 100 \tag{F6}$$

$$\text{Moisture absorption amount per surface area (mg/}m^2\text{)} = \text{weight increase (mg)}/(\text{sample amount (g)} \times \text{specific surface area (}m^2/g\text{))} \tag{F7}$$

TABLE 3

|  | Ex. 1 | Ex. 2 | Comp. Ex. 1 | Comp. Ex. 2 | Comp. Ex. 3 | Comp. Ex. 4 | Comp. Ex. 5 |
| --- | --- | --- | --- | --- | --- | --- | --- |
| Silica sol | [1A] | [2A] | [1B] | [2B] | [3B] | [4B] | [5B] |
| Specific surface area S ($m^2/g$) | 181 | 202 | 184 | 129 | 189 | 201 | 75 |
| BET particle size D1 (nm) | 15.0 | 13.4 | 14.8 | 21.0 | 14.4 | 13.5 | 36 |
| DLS particle size D2 (nm) | 20 | 26 | 20 | 27 | 17 | 36 | 76 |
| D2 × S | 3,620 | 5,250 | 3,680 | 3,480 | 3,210 | 7,240 | 5,700 |
| Percent moisture absorption (%) | 5.3 | 6.0 | 5.8 | 6.6 | 6.6 | 10.3 | 8.5 |
| Moisture absorption amount/surface area (mg/$m^2$) | 0.29 | 0.30 | 0.32 | 0.51 | 0.35 | 0.51 | 1.1 |

In the case where the reaction medium has a small water content, and the silica particle size is grown at low reaction temperature (as described in the prior art document), when the mean particle size D1 determined through the nitrogen absorption method is relatively small (Comparative Example 4), the particle shape is not uniform. As is clear from Table 3, the dynamic light scattering particle size D2 was large, even though the specific surface area was large. In the case where the mean particle size D1 determined through the nitrogen absorption method is relatively large (Comparative Example 5), a large number of silanol groups remain in the silica particles, to thereby reduce the density of particles. As is clear from Table 3, the moisture absorption amount per specific surface area was found to increase. Thus, Comparative Examples 4 and 5, described in the prior art document, were found to fail to produce silica particles which enable provision of the silica sol of the present invention.

Organic Solvent-Dispersed Sol

Example 3

In a manner similar to that of Example 2, a dispersion of grown silica particles was provided. The dispersion was concentrated by means of a rotary evaporator at 26.7 kPa, thereby yield a water-dispersed silica sol having an $SiO_2$ content of 25 mass %, a pH of 7.5, and an $NH_3$ content of 0.02 mass %. Then, methanol (40 g) was added to the silica sol (380 g), and tri-n-propylamine (0.4 g) and 3-methacryloxytrimethoxysilane (KBM-503, product of Shin-Etsu Chemical Co., Ltd.) (15.8 g) were added thereto under stirring. The mixture was heated to 60° C. and was allowed to react at 60° C. for 3 hours. Subsequently, the sol was placed in a rotary evaporator. While the sol was distilled at 53.3 kPa, methanol was added thereto so as to maintain the dispersion volume in the flask. Under the conditions, methanol substitution was carried out to thereby adjust the water content of the sol to 2%. Subsequently, distillation was continued while methyl ethyl ketone (hereinafter abbreviated as MEK) was added thereto, to thereby yield MEK-dispersed silica sol [3A] having an $SiO_2$ content of 30.0 mass %, a methanol content of 0.4 mass %, a water content of 0.3 mass %, an Ostwald viscosity (20° C.) of 2.1 mPa·s, and a dynamic light scattering particle size of 32 nm.

Comparative Example 6

The procedure of Example 3 was repeated, except that 28-mass % aqueous ammonia (0.4 g) was added instead of tri-n-propylamine, to thereby yield MEK-dispersed silica sol [6B] ($SiO_2$ content: 30.0 mass %, methanol content: 0.4 mass %, water content: 0.3 wt. %, Ostwald viscosity (20° C.): 2.8 mPa·s, and dynamic light scattering particle size: 36 nm).

[Determination of Free Base]

The free base amount of each of the final sols of Example 3 and Comparative Example 5 was determined through a method essentially similar to the method applied to the silica sol of Example 1. In the free base determination, an equiamount of 10-mmol/L hydrochloric acid was added to each of the silica sols of Example 3 and Comparative Example 5. Then, the product was subjected to concentrate to dryness under reduced pressure by means of a rotary evaporator. The thus-obtained gel was pulverized to form a powder, and 10-mmol/L hydrochloric acid was added to the powder. The mixture was shaken and then centrifuged. The base content of the supernatant was determined through ion chromatography.

[Measurement of Specific Surface Area]

The specific surface area of each of the silica sols of Example 3 and Comparative Example 5 was determined through a method essentially similar to the method applied to the silica sol of Example 1. In the measurement, the organic solvent of the silica sol was evaporated for drying at 60° C. by means a vacuum drier, to thereby form a silica gel. The gel was pulverized with a mortar, and the powder was further dried at 180° C. for 3 hours, to thereby yield a silica dry powder. The specific surface area ($m^2$/g) of the powder was determined through a nitrogen absorption method.

[Measurement of Percent Moisture Absorption]

The percent moisture absorption of each of the silica sols of Example 3 and Comparative Example 5 was determined through a method essentially similar to the method applied to the silica sol of Example 1.

[Dynamic Light Scattering (DLS) Particle Size and Viscosity]

The dynamic light scattering (DLS) particle size and the viscosity of each of the silica sols of Example 3 and Comparative Example 5 were determined. In this case, the silica sol was diluted with MEK, and the dynamic light scattering particle size of the dispersion was determined. The viscosity was measured by means of an Ostwald viscometer in a thermostat bath at 20° C.

TABLE 4

| | | Ex. 3 | Comp. Ex. 6 |
|---|---|---|---|
| Final sol | Silica sol | [3A] | [6B] |
| | Specific surface area ($m^2$/g) | 183 | 184 |
| | Percent moisture absorption (%) | 1.5 | 1.6 |
| | Free ammonia (mass %) | <0.002 | 0.01 |
| Initial properties | Free amine (mass %) | 0.06 | — |
| | Viscosity (mPa · s) | 2.1 | 2.5 |
| | DLS particle size D2 (nm) | 32 | 33 |
| 50° C., 2 weeks | Appearance | colorless | pale yellow |
| | Viscosity (mPa · s) | 2.2 | 2.7 |
| | DLS particle size D2 (nm) | 32 | 35 |
| | Appearance | colorless | yellow |

As is clear from Table 4, the silica sol of Example 3 was colorless in appearance after storage, whereas the silica sol of Comparative Example 6, in which free ammonia remained, was found to be yellow after storage.

As described hereinabove, in Examples 1 to 3, a silica sol having excellent moisture absorption resistance and stability as well as high purity was able to be produced. When such a high-purity silica sol produced in the Examples is used in a solvent or a resin, coloring thereof can be prevented, as compared with silica sols of Comparative Examples.

The invention claimed is:

1. A silica sol, wherein the silica sol comprises silica particles produced through hydrolysis of a silicon alkoxide without using an organic base, water and/or a liquid organic medium serving as a dispersion medium, and at least one of a secondary amine and a tertiary amine, the silica particles being dispersed in the dispersion medium, wherein the silica particles satisfy the following requirements (a) to (c):
   (a) the silica particles have a specific surface area, as determined through a nitrogen absorption method, of 20 to 500 $m^2$/g;
   (b) the silica particles have a moisture absorption amount per specific surface area of the silica particles of 0.5 mg/$m^2$ or less; and
   (c) the at least one of a secondary amine and a tertiary amine is not substantially contained in the inside of the silica particles.

2. A silica sol according to claim 1, wherein the silica particles satisfy the following formula:

$$D2 \times S \leq 6800 \qquad [F1]$$

(wherein S (m²/g) represents a specific surface area determined through the nitrogen absorption method, and D2 (nm) represents a mean dispersed particle size in the dispersion medium as determined through a dynamic light scattering method).

3. A silica sol according to claim 1, wherein the at least one of a secondary amine and a tertiary amine content is 0.001 to 0.5 mmol/g, with respect to the silica particles.

4. A silica sol according to claim 1, wherein the silicon alkoxide is at least one compound selected from the group consisting of tetramethyl silicate (TMOS), tetraethyl silicate (TEOS), methyl triethyl silicate, dimethyl diethyl silicate, trimethyl ethyl silicate, and a trialkyl silicate having a C1 or C2 alkyl group.

5. A method for producing the silica sol of claim 1, wherein the method comprises the following steps (A), (B), and (C):
   (A) a step of providing a medium which is formed of water and/or a hydrophilic organic solvent, which contains water in an amount of 60 mass % or more and ammonia in an amount of 0.005 to 1.0 mol with respect to 1 L of the medium, and which is at 60° C. or higher;
   (B) a step of continuously or intermittently adding, to the medium, a silicon alkoxide in such an amount that the ratio by mole of ammonia to the entirety of the silicon alkoxide added (N/Si) is adjusted to 0.01 to 1.0, to thereby form silica particles, while the following conditions (i) to (iii):
      (i) the N/Si mole ratio is 0.01 or higher during the course of reaction;
      (ii) the medium has a water content of 60 mass % or higher; and
      (iii) the medium has a temperature of 60° C. or higher, are maintained; and
   (C) a step of adding an organic base compound to the medium in which the silica particles obtained in step (B) are dispersed, and then removing the entirety or a part of the ammonia from the medium.

6. A silica sol production method according to claim 5, wherein, in step (C), after formation of the silica particles, the reaction medium is heated at a temperature equal to or higher than the boiling temperature of the reaction medium, in order to remove the entirety or a part of the ammonia.

7. A silica sol according to claim 1, wherein the silica particles have a specific surface area, as determined through a nitrogen absorption method, of 30 to 300 m²/g.

8. A silica sol according to claim 1, wherein the silica particles have a moisture absorption amount per specific surface area of the silica particles of 0.33 mg/m² or less.

9. A silica sol according to claim 1, wherein the at least one of a secondary amine and a tertiary amine content is 0.005 to 0.1 mmol/g, with respect to the silica particles.

10. A silica sol according to claim 1, wherein the silica particles are produced through hydrolysis of the silicon alkoxide in the presence of ammonia, and produced by the following method comprising the following steps (A), (B), and (C):
   (A) a step of providing a medium which is formed of water and/or a hydrophilic organic solvent, which contains water in an amount of 60 mass % or more and ammonia in an amount of 0.005 to 1.0 mol with respect to 1 L of the medium, and which is at 60° C. or higher;
   (B) a step of continuously or intermittently adding, to the medium, the silicon alkoxide in such an amount that the ratio by mole of ammonia to the entirety of the silicon alkoxide added (N/Si) is adjusted to 0.01 to 1.0, to thereby form silica particles, while the following conditions (i) to (iii):
      (i) the N/Si mole ratio is 0.01 or higher during the course of reaction;
      (ii) the medium has a water content of 60 mass % or higher; and
      (iii) the medium has a temperature of 60° C. or higher, are maintained; and
   (C) a step of adding a secondary amine or a tertiary amine to the medium in which the silica particles obtained in step (B) are dispersed, and then removing the entirety or a part of the ammonia from the medium.

* * * * *